(12) United States Patent
Ash et al.

(10) Patent No.: US 6,487,979 B2
(45) Date of Patent: Dec. 3, 2002

(54) STOWABLE SHELF ASSEMBLY

(75) Inventors: David L. Ash, Warsaw, IN (US); John E. Knudtson, Granger, IN (US); DeRay G. Steffensen, Goshen, IN (US); Gene A. Dylewski, Granger, IN (US)

(73) Assignee: Utilimaster, Wakarusa, IN (US)

( * ) Notice: Subject to any disclaimer, the term of this patent is extended or adjusted under 35 U.S.C. 154(b) by 0 days.

(21) Appl. No.: 09/808,846

(22) Filed: Mar. 15, 2001

(65) Prior Publication Data

US 2001/0035114 A1 Nov. 1, 2001

Related U.S. Application Data

(60) Provisional application No. 60/189,540, filed on Mar. 15, 2000.

(51) Int. Cl.[7] .............................................. A47B 23/00
(52) U.S. Cl. ........................ 108/144; 108/134; 108/42
(58) Field of Search ........................... 108/134, 44, 47, 108/48, 42, 108; 248/240, 241, 242, 291.12

(56) References Cited

U.S. PATENT DOCUMENTS

| 1,473,850 A | 11/1923 | Greene |
| 2,574,483 A | 11/1951 | Jack |
| 3,874,009 A | 4/1975 | Nosaka et al. |
| 3,897,971 A | 8/1975 | Evans |
| 3,911,832 A | 10/1975 | Vandergriff |
| 3,929,371 A | 12/1975 | Gibson |
| 3,934,924 A | * 1/1976 | Diliberti |
| 4,281,870 A | 8/1981 | Ehrlich et al. |
| 4,730,738 A | 3/1988 | Bartus et al. |
| 5,143,337 A | * 9/1992 | Tomayko, Jr. et al. |
| 5,314,200 A | 5/1994 | Phillips |
| 5,755,478 A | 5/1998 | Kamiya et al. |
| 5,868,263 A | 2/1999 | McAllister et al. |
| 5,934,725 A | 8/1999 | Bowers |
| 6,192,806 B1 | * 2/2001 | Chen |
| 6,347,590 B1 | * 2/2002 | D'Annunzio et al. |

* cited by examiner

Primary Examiner—Jose V. Chen
(74) Attorney, Agent, or Firm—Barnes & Thornburg

(57) ABSTRACT

A stowable shelf assembly for use in a vehicle. The shelf assembly has a shelf and a bracket. The shelf has a first flange and a brace member each extending outwardly from the shelf. The shelf is also movable between use and stowed positions. The bracket has a second flange and a support, each extending outwardly from the bracket. The first flange of the shelf is located between the second flange and the support. The first flange abuts the second flange, the shelf is carried by the support and the brace member is adjacent the bracket while the shelf is in the use position. Conversely, the first flange is spaced apart from the second flange, the shelf is spaced apart from the support and the brace member is spaced apart from the bracket while the shelf is in the stowed position.

9 Claims, 11 Drawing Sheets

FIG. 5

STOWABLE SHELF ASSEMBLY

RELATED APPLICATION

This application is a utility conversion of U.S. Provisional Patent Application Ser. No. 60/189,540, filed on Mar. 15, 2000, the complete disclosure of which is hereby expressly incorporated by reference.

BACKGROUND AND SUMMARY

The present invention relates to storage shelf assemblies for use in vehicles of the type that carry parcels.

Wall mounted shelves being movable between lowered use and raised stowed positions for use in vehicles are known. These assemblies, however, often employ complicated brace and bracket assemblies. In addition, many shelves are not suitable to support substantial weight for use in commercial vehicles. Vehicles like mail trucks, for example, store substantial amounts of mail and parcels in a relatively confined amount of space. This mail can be quite heavy, and much of it, therefore, is stored on the flooring of the vehicle. Storing mail and parcels in such a way, however, is not always the most efficient use of the available space in the vehicle.

It would be desirable, therefore, to provide a shelf assembly for use in a vehicle that can hold the weight of pounds. In addition, the shelf should be usable in an uncomplicated manner, and be movable or even removable to allow further flexibility in the shelf's functionality, and accommodate the particular needs of the vehicle operator.

Accordingly, an illustrative embodiment provides a stowable shelf assembly for use in a vehicle. The shelf assembly comprises a shelf and a bracket. The shelf has a first flange and a brace member each extending outwardly from the shelf. The shelf is also movable between use and stowed positions. The bracket has a second flange and a support, each extending outwardly from the bracket. The first flange of the shelf is located between the second flange and the support. The first flange abuts the second flange, the shelf is carried by the support, and the brace member is adjacent the bracket while the shelf is in the use position. Conversely, the first flange is spaced apart from the second flange, the shelf is spaced apart from the support, and the brace member is spaced apart from the bracket while the shelf is in the stowed position.

It is contemplated that the illustrated embodiment may include the shelf being movable to a removed position that is spaced apart from the bracket. The bracket may further comprise a channel extending between the second flange and the support, and configured to receive the first flange of the shelf. The shelf may further comprise a third flange extending outwardly from the shelf and positioned adjacent the support of the bracket when the shelf is in the use position, and spaced apart from the support of the bracket when the shelf is in the stowed position.

It is contemplated that the illustrated embodiment may include the shelf having a shelf extension. The shelf extension may foldably extend from the shelf between first and second use positions and a stowed position.

Another illustrative embodiment may provide a vehicle for carrying parcels having at least one side wall. The vehicle further comprising a shelf and a bracket as previously described.

Additional features and advantages of the stowable shelf assembly will become apparent to those skilled in the art upon consideration of the following detailed descriptions exemplifying the best mode of carrying out the assembly as presently perceived.

BRIEF DESCRIPTION OF THE DRAWINGS

Illustrative embodiments of the assembly will be described hereafter with reference to the attached drawings which are given as non-limiting examples only, in which:

FIG. 5 is a perspective view of the stowable shelf assembly of FIG. 1 with the shelf located in the removed position;

Corresponding reference characters indicate corresponding parts throughout the several views. The exemplification set out herein is not to be construed, however, as limiting the scope of the invention in any manner.

DETAILED DESCRIPTION OF THE DRAWINGS

Figure 1:
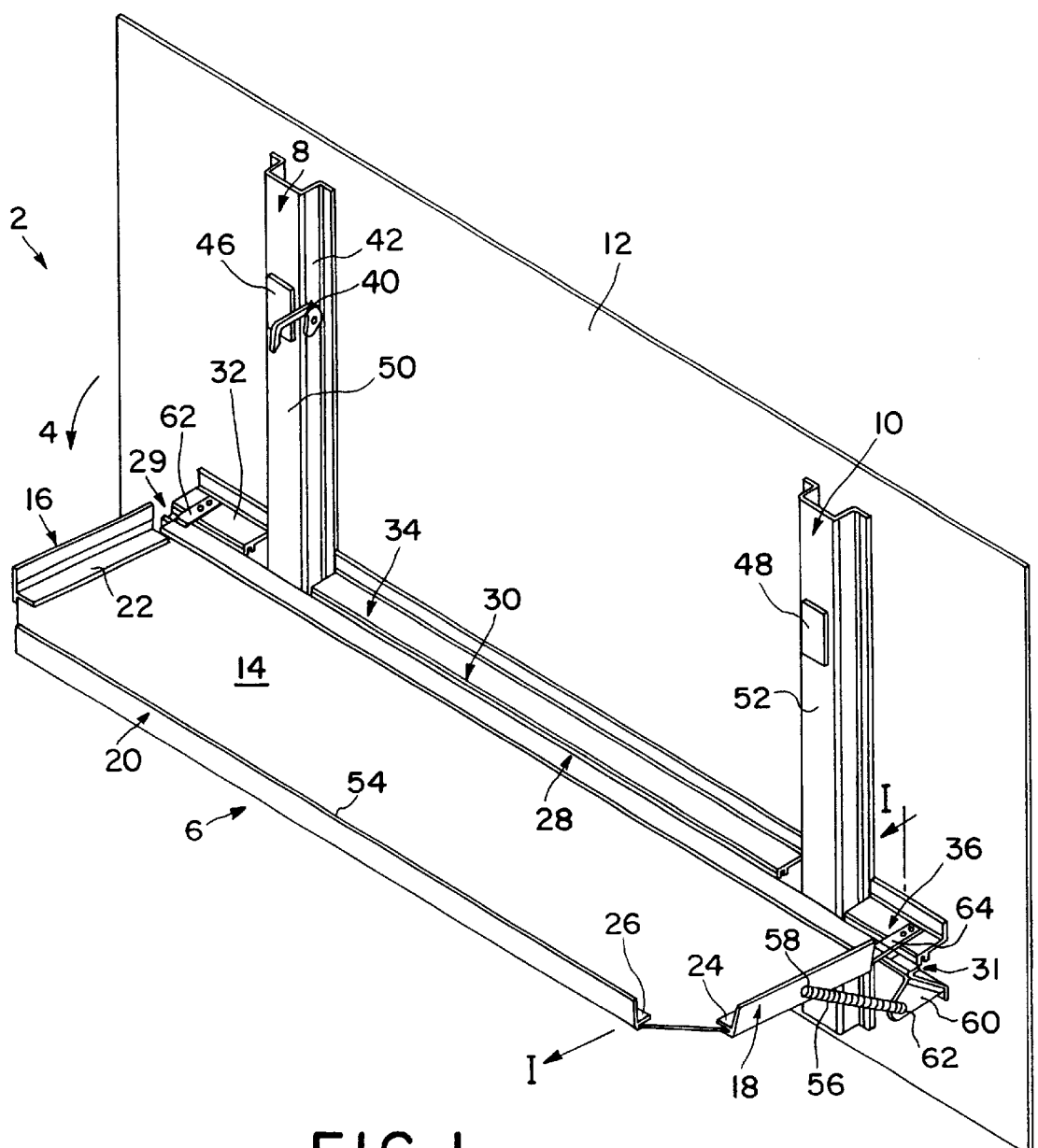
FIG. 1 is a perspective view of a stowable shelf assembly with the shelf located in a use position.

The stowable shelf assembly of the present invention is configured to operate within the interior confines of a vehicle, like a mail or delivery truck. Such a stowable shelf assembly 2 is shown in FIG. 1 placed in its use position 4. Use position 4 allows parcels or other articles to be placed on shelf 6 for storage. In the illustrated embodiment, wall studs 8, 10 are attached in a spaced apart manner on wall 12. Shelf 6 comprises a shelf panel 14, two end rails 16, 18, and a side rail 20. End rails 16, 18 are illustratively "L"-shaped panels having lower ends 22, 24 appended to the edge shelf panel 14 at opposite ends thereof. End panel 20 is also "L"-shaped, having a lower end 26 appended to shelf panel 14 along the side length of same.

Hinge 28 couples to shelf panel 14 by engaging channel portions 29, 30, 31 of brackets 32, 34, 36, respectively. In the illustrated embodiment, brackets 32, 34, 36 are attached to wall 12 such that channel portions 29, 30, 31 are coaxially aligned. Each bracket 32, 34, 36 is also positioned such that brackets 32, 34 are positioned adjacent wall stud 8, and brackets 34 and 36 are positioned adjacent wall stud 10. In this embodiment, shelf assembly 2 is attached to wall 12 while still accommodating wall studs 8, 10 that are common to many delivery vehicles. Hinge 28 pivots relative to channel portions 29, 30, 31 between use and stowed positions 4, 38, respectively, (see FIG. 4) without any interference from wall studs 8, 10.

In the illustrated embodiment, a clasp 40 is attached to a side panel 42 of wall stud 8. As will be discussed hereinafter below in greater detail, clasp 40 is a hook-like structure that is positioned over end panel 20 when shelf 6 is placed in stowed position 38. Pads 44, 46 are provided on front surfaces 50, 52 of wall studs 8, 10, respectively. The positioning of pads 46, 48 is such that when top edge 54 of end panel 20 is placed in stowed position 38, it contacts pads 46, 48, rather than front surfaces 50, 52. This protects rail 20 from damage by any forced contact that might occur between top edge 54 and front surfaces 50, 52. It is contemplated that pads 46, 48 can be made from any force-absorbing or resilient material, including rubber, vinyl, foam or plastic, for example.

To assist shelf 6 from making a rattling noise during travel of the vehicle while shelf 6 is in its use position, a biasing member 56, similar to an elastic band, is attached to both shelf 6 and bracket 36. Specifically, and as shown in FIG. 1, biasing member 56 is attached to end rail 18 via first pin 58. A tab 60 depends from bracket 36, and biasing member 56 is attached to same via a second pin 62. Biasing member 56 biases shelf 6 toward the use position 4. It is contemplated that biasing member 56 can be made from any resilient material, like rubber or plastic, or can even be a spring. It is further contemplated that tab 60 illustratively depends from bracket 36. Illustratively, tab 60 may depend from either bracket 32 or 34 as well. In addition, the biasing force against shelf 6 to remain in use position 4 can be achieved in any sufficient conventional manner in lieu of biasing member 56.

To prevent shelf 6 from being removable relative to brackets 32, 34, 36, "L"-shaped brackets 62, 64 are provided on same and positioned over channel 29, 31, respectively. (See FIG. 6 for further detail.) In this configuration, and as will be discussed in greater detail hereinafter below, "L"-shaped brackets 62, 64 interfere with lateral movement of hinge 28 relative to channels 29, 30, 31, thus, preventing shelf 6 from spacing apart from brackets 32, 34, 36. In the illustrated embodiment, "L"-shaped brackets 62, 64 are attached to brackets 32, 36 by removable fasteners 63. It is appreciated that fasteners 63 can be threaded bolts, or friction-fitting pins or rivets. It is also appreciated that such brackets may be configured to be positioned anywhere along channels 29, 30, 31, or in other manner that prevents the lateral movement of hinge 28.

Figure 2:
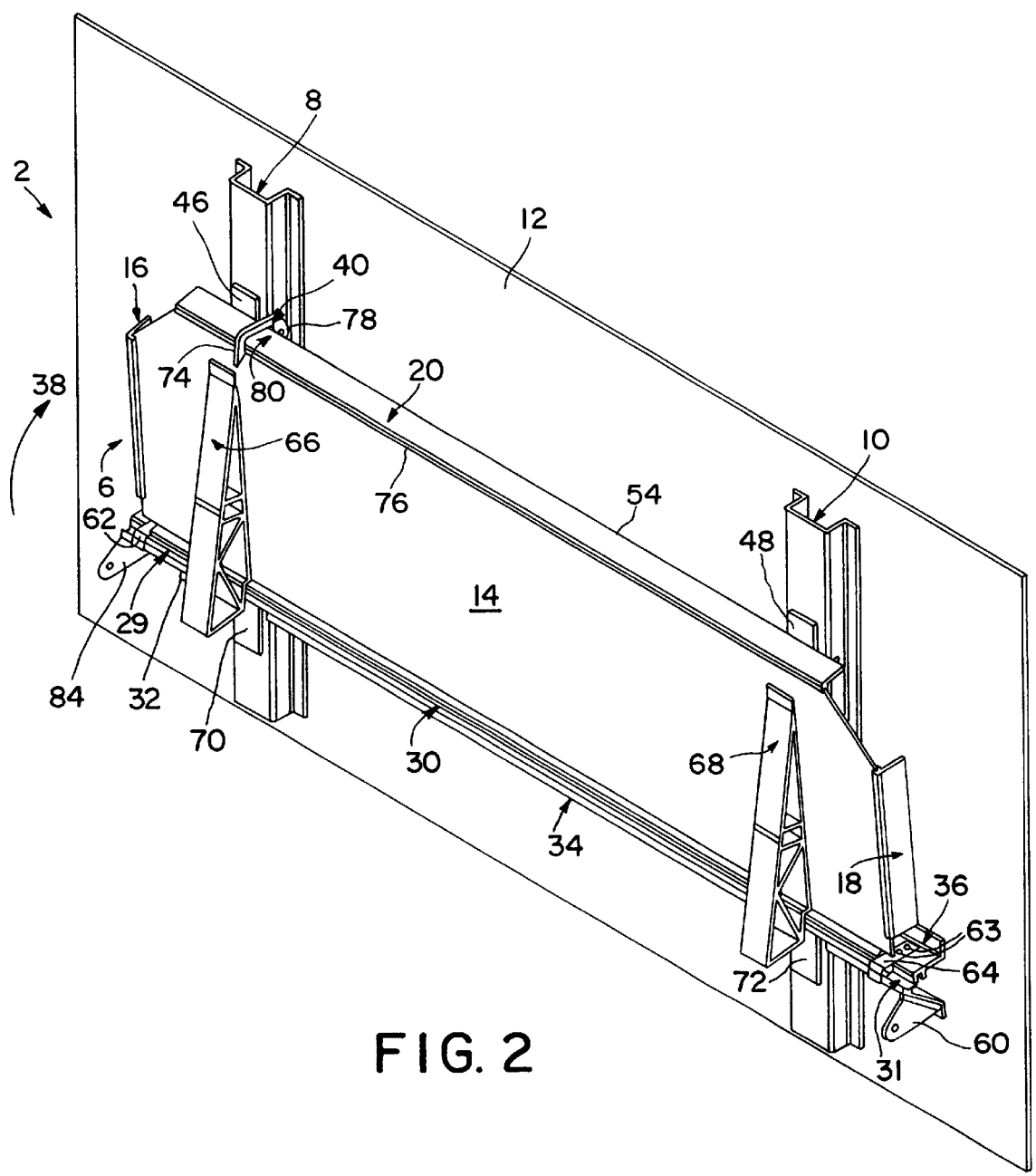
FIG. 2 is a perspective view of the stowable shelf assembly of FIG. 1 with the shelf located in a stowed position.

A perspective view of the stowable shelf assembly 2 with shelf 6 located in the stowed position 38 is shown in FIG. 2. Allowing shelf 6 to be movable between use and stowed positions 4, 38, respectively, offers the operator of the vehicle more options of storing and arranging mail or parcels within the vehicle. As shown, gussets 66, 68 are provided on the underside of shelf panel 14. While in use position 4, gussets 66, 68 provide structural support to shelf 6, allowing substantial weight to be placed onto same. Pads 70, 72 provided adjacent gussets 66, 68, respectively, are provided on front surfaces 50, 52, respectively.

Also shown in FIG. 2 is shelf 6 being held in stowed position 38 by clasp 42. In the illustrated embodiment, clasp 40 engages end panel 20 via a hooked end 74 depending from same. Hook 74 is configured to engage a lower lip 76 provided on end panel 20 opposite top edge 54. This allows shelf 6 to be secured against pads 46, 48 in use position 4 until clasp 40 is moved about pivot 78, illustratively a pin or rivet. By raising clasp 40 in direction 80, hook 74 clears end panel 20, thereby causing shelf 6 to lower to use position 4.

A second tab 84 depending from bracket 32 is also shown in FIG. 2. As previously discussed, it is appreciated that additional depending tabs, like tab 84, may depend from a bracket other than bracket 32, 36, as shown, to attach a biasing member, such as biasing member 56. It is further shown how "L"-shaped brackets 62, 64 are positioned over channels 29 and 31.

Figure 3:
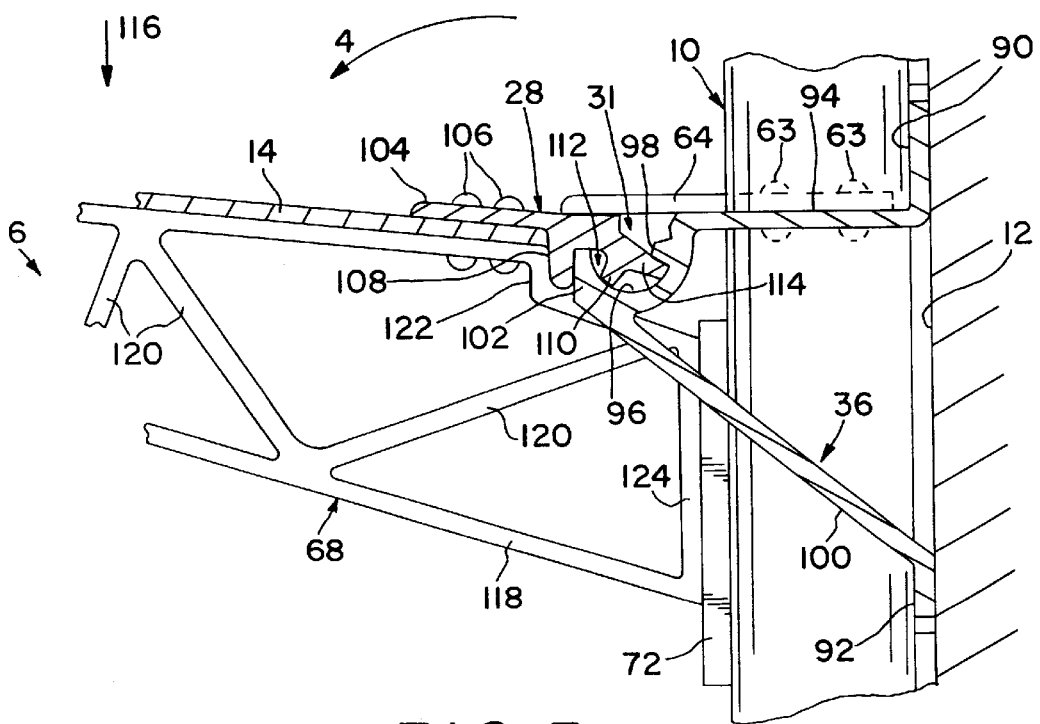
FIG. 3 is a partial cross-sectional view of the stowable shelf assembly of FIG. 1 along line I—I with the shelf located in the use position.

A partial cross-sectional view of stowable shelf assembly 2 with shelf 6 located in use position 4 is shown in FIG. 3. Bracket 36 comprises wall panels 90, 92 that attach to wall 12. Wall panels 90, 92 can be attached to wall 12 via bolts, welds or the like. Wall panel 90 is appended to top panel 94. Top panel 94 is extended such that channel 91 is not coaxially interfered with by wall stud 10. Channel portion 31 extends from top panel 94 opposite wall panel 90. Channel portion 31 is sized to receive hinge 28 and comprises a channel wall 96 extending upwardly the length of bracket 36. A support flange 98 extends from channel wall 96 along the length of same. A support end 102 is provided opposite top panel 94. Support flange and end 98, 102, respectively, are configured to hold shelf 6 in use position 4, as discussed in greater detail hereinafter below.

A brace 100 of bracket 36 is provided between channel portion 31 and wall panel 92. In the illustrated embodiment, brace 100 depends at an angle relative to top panel 94 for increased weight to be supported on the stowable shelf assembly. It is appreciated that the bracket portion of the assembly can be of a single extrusion making it high strength and more cost effective to manufacture. In addition, the shelf assembly can be made from a light weight metal like aluminum or even a strong plastic. It is appreciated that the other brackets 32, 34 are of the same shape and, thus, are too well suited to be formed from an extruded metal or plastic.

Hinge 28 is also shown in FIG. 3. Hinge 28 is shown attached to shelf panel 14 by a hinge panel 104 extending the surface of and positioned adjacent to shelf panel 14. Fasteners 106, like rivets or threaded screws, extend through both hinge panel 104 and shelf panel 14 to secure same together. Hinge 28 also includes a flange 108 extending therefrom and illustratively along the length of hinge 28 and positioned adjacent end flange 102 on channel portion 31 when shelf 6 is in use position 4. Another flange 110, also extending from hinge 28 and illustratively along the length of hinge 28, is positioned adjacent end flange 102 on channel portion 31 when shelf 6 is in use position 4. Flanges 108, 110 form a channel 112 therebetween, sized to receive end flange 102 of channel portion 31.

Still, another flange 114 extends generally transversely from flange 110. Flange 114 is seated adjacent support flange 98 when shelf 6 is in the use position 4. Flange 102 of channel portion 31 is seated in channel 112 of hinge 28 which serves as a support or fulcrum. The downward movement caused by force 116 from weight from mail and parcels, for example, causes flange 114 to pivot upward against support flange 98. The interaction of flanges 114 and 98, and 108 and 110 limits the pivoting movement of hinge 28 to the use position 4 as force 116 is continually applied. It is appreciated that all of the structural features of FIGS. 3 and 4 extending the length of bracket 36 are also found on brackets 32, 34. (See, for example, FIG. 5.) Gusset 68 comprises a frame 118 with a plurality of angled supports 120 extending within frame 118. In the illustrated embodiment, frame 118 includes first and second frame walls 122, 124. In use position 4, frame wall 122 is positioned adjacent flange 108 on hinge 28, and frame wall 124 is positioned adjacent pad 72. As weight is applied causing force 116, a moment force is created about hinge 28/channel portions 29, 30, 31. This causes a force to be applied to frame walls 122, 124 against flange and pad 108 and 72, respectively, aiding to the supporting strength of gusset 68. It is appreciated that what was hereinbefore described relative to gusset 68 is also applicable to gusset 66.

Figure 4:
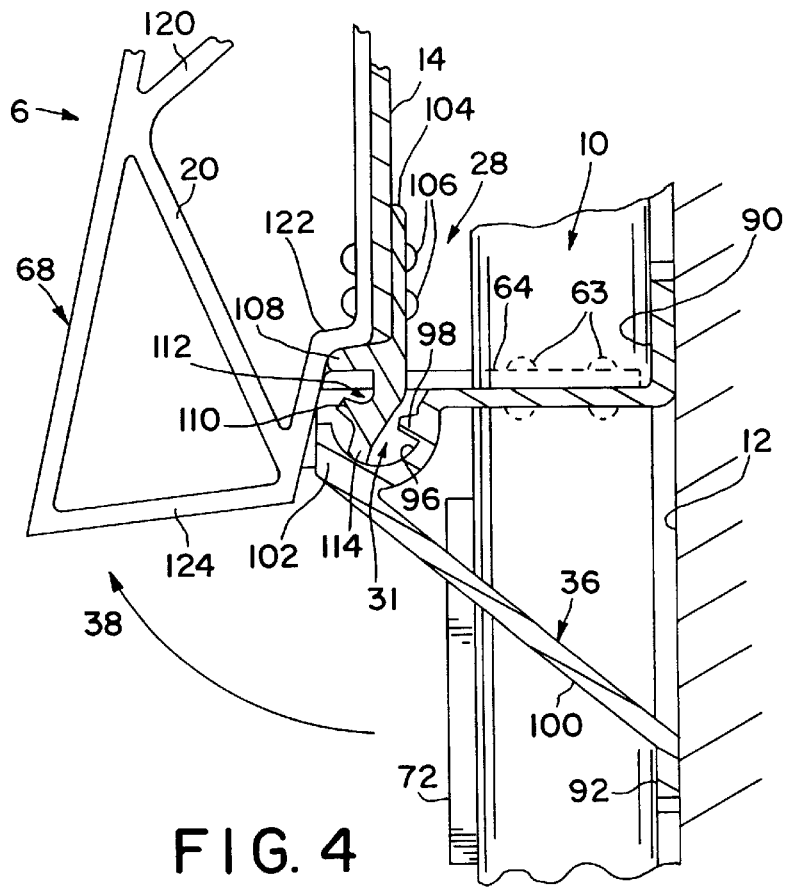
FIG. 4 is a partial cross-sectional view of the stowable shelf assembly of FIG. 1 along line I—I with the shelf located in the stowed position.

A partial cross-sectional view of stowable shelf assembly 2 is shown in FIG. 4 with shelf 6 located in stowed position 38. As previously discussed, shelf 6 is movable between use and stowed positions 4, 38, respectively. When shelf 6 is moved to stowed position 38, hinge 28 is positioned such that hinge panel 104 is oriented in a generally vertical position. Accordingly, flange 114 moves to a spaced apart position relative to support flange 98 while still adjacent channel wall 96. End flange 102 from channel portion 31 is spaced apart from channel 112 and flanges 108, 110 are no longer positioned adjacent end flange 102 and channel wall 96, respectively. It is appreciated that flange 114 will travel along the curvature of channel wall 96 being carried by same as shelf 6 is located in stowed position 38. (Compare the relative positions of flange 114 between FIGS. 3 and 4.)

Figure 5:
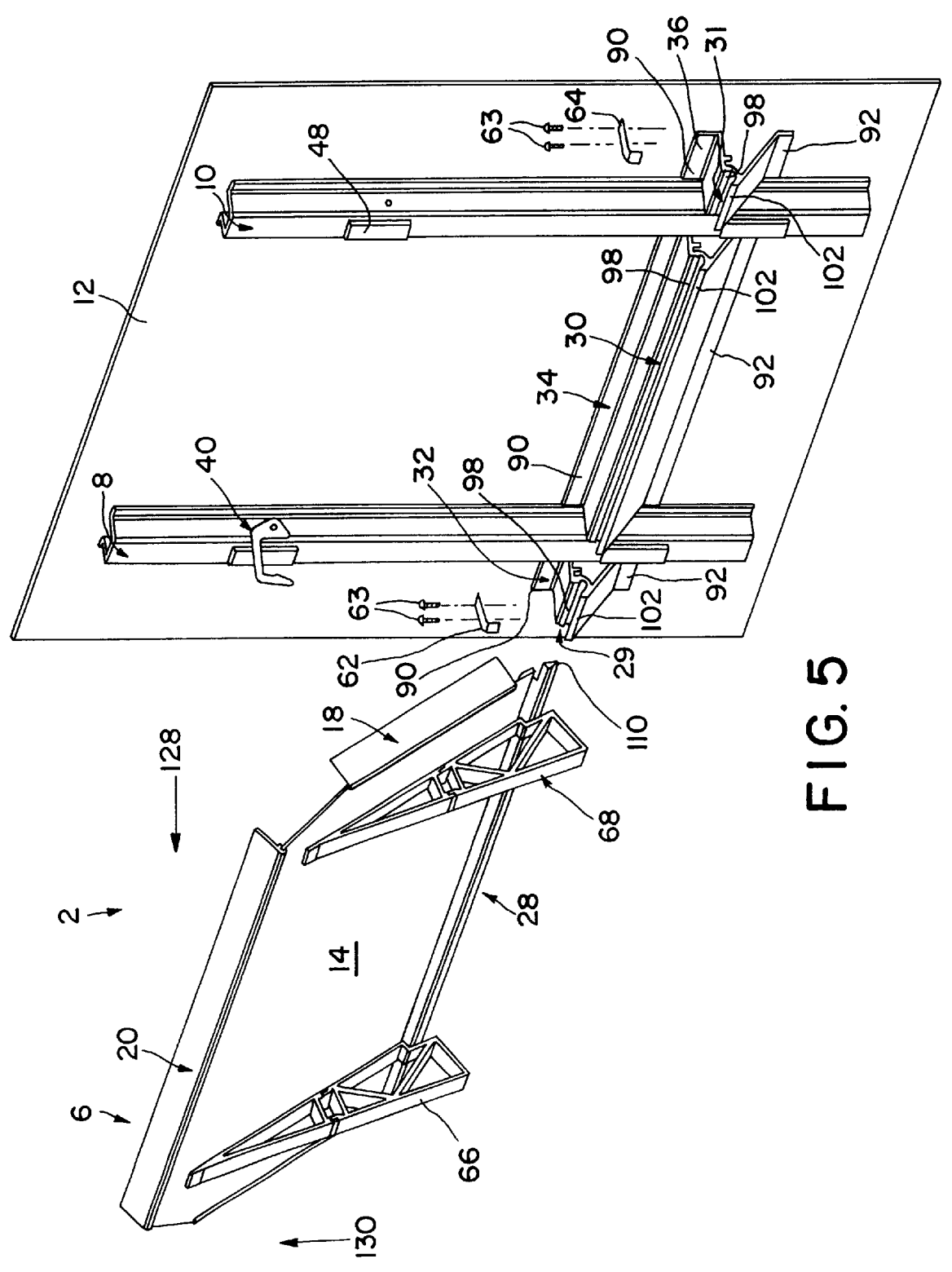

A perspective view of stowable shelf assembly 2 is shown in FIG. 5 with shelf 6 in a spaced apart position 128 from brackets 32, 34, 36. Illustratively, shelf 6 can only be spaced apart by first removing "L"-shaped brackets 62, 64 from brackets 34, 36. "L"-shaped brackets 62,64 are removed by removing fasteners 63. (See, for example, FIG. 6.) As shown in FIG. 4, when shelf 6 is in stowed position 38, no part of channel portion 31 impedes hinge 28 from being removed from same. The only contact between shelf 6 and channel portion 31 is flange 108 of hinge 28 carried by channel wall 96. A lifting force 130 can then be applied to shelf 6 to lift hinge 28 out of channel portions 29, 30, 31 thereby removing shelf 6.

Figure 6:
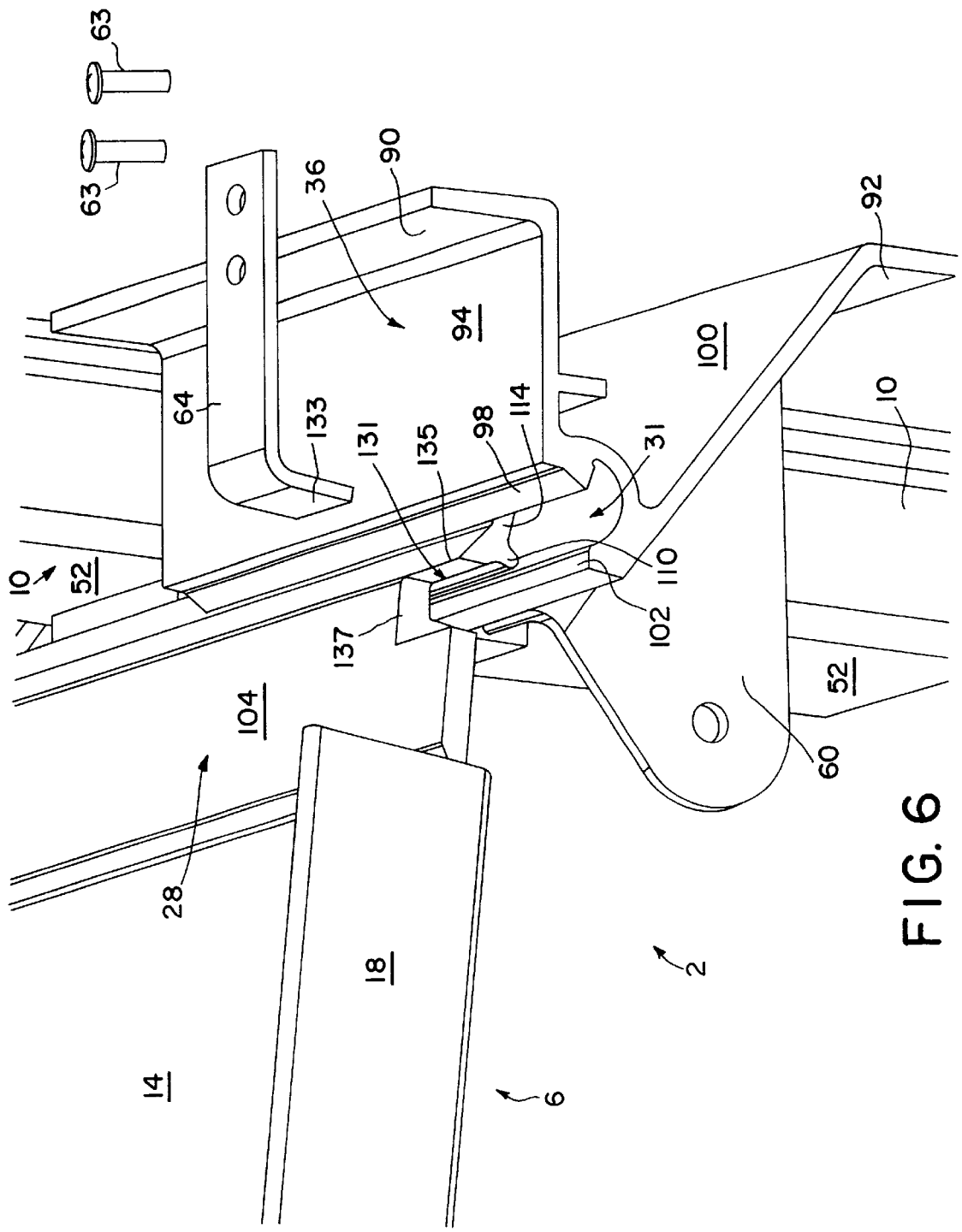
FIG. 6 is a perspective view of a detailed portion of the stowable shelf assembly of FIG. 1.

A perspective view of stowable shelf assembly 2 in FIG. 6 shows the detail of slot 131. Slot 131 is a recessed portion disposed in hinge 28 that is provided at each end of shelf 6. "L"-shaped bracket 64 includes a depending portion 133 that extends through slot 131 when attached to top panel 94. This causes top corner 135 of hinge 28 to contact "L"-shaped bracket 64, therefore, preventing hinge 28 from being removed from channel portion 31 of bracket 36. In addition, "L"-shaped bracket 64 is positioned adjacent inner wall 137 of slot 131, limiting movement of hinge 28 longitudinally along channel portion 31. Fasteners 63, as previously discussed, are removed from bracket 36, as shown in FIG. 6, to remove shelf 6.

Figure 7:
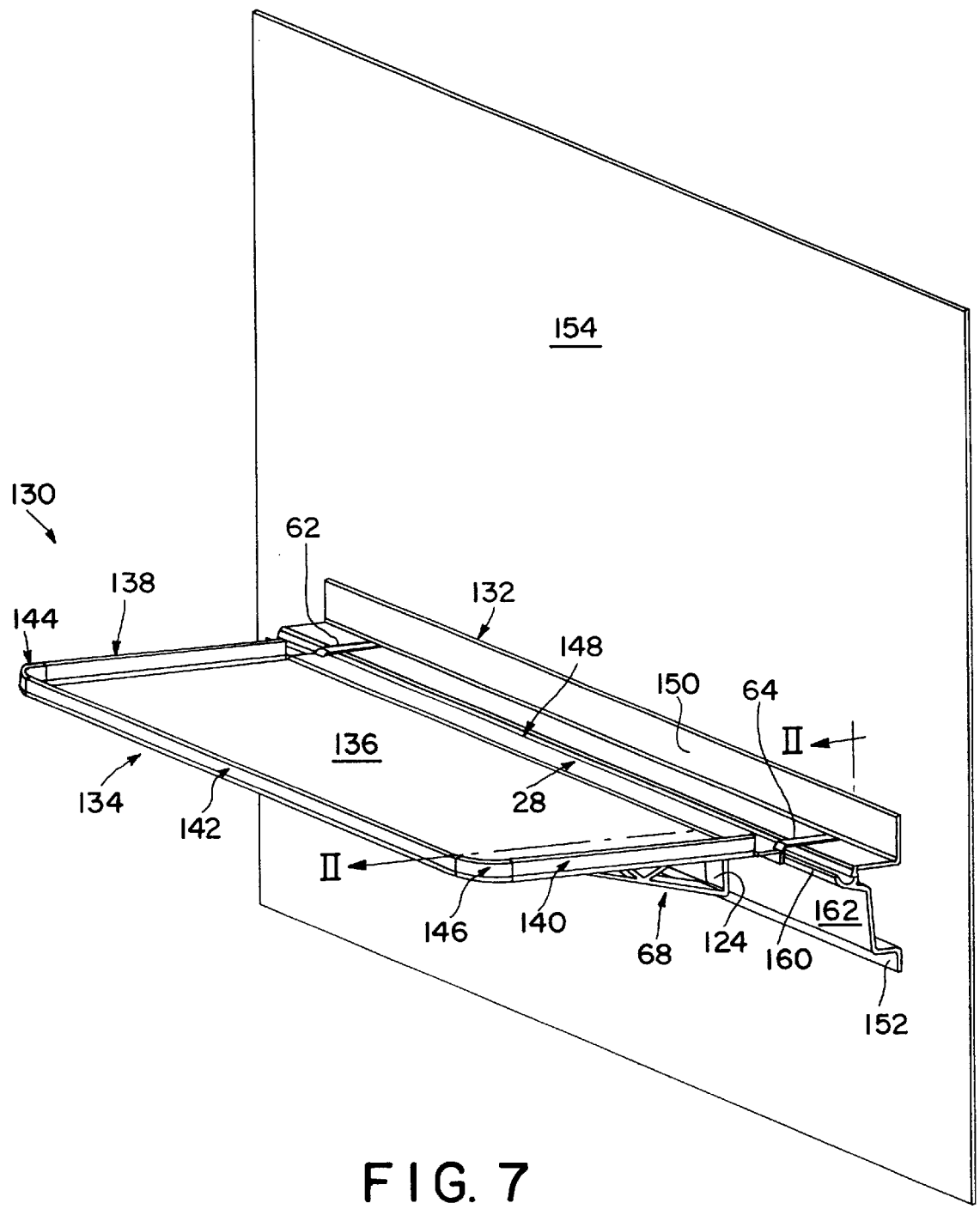
FIG. 7 is a perspective view of another embodiment of the stowable shelf assembly with the shelf located in the use position.

A perspective view of another embodiment of a removable shelf assembly 130 is shown in FIG. 7. This embodiment employs a single bracket 132 to support a shelf 134. This is in contrast to the three-part brackets 32, 34, 36 as depicted in FIGS. 1 through 6. Shelf 134 comprises a shelf panel 136, two end rails 138, 140, and a side rail 142. End rails 138, 140 are connected to side rail 142 by corner rails 144, 146 attached therebetween.

Hinge 28, as described in the previous embodiment, is appended to shelf panel 136 and engages channel 148 of bracket 132. As also previously discussed, hinge 28 pivots relative to channel 148 between use and stowed positions 4, 38, respectively, as shown in FIGS. 8 and 9.

Figure 8:
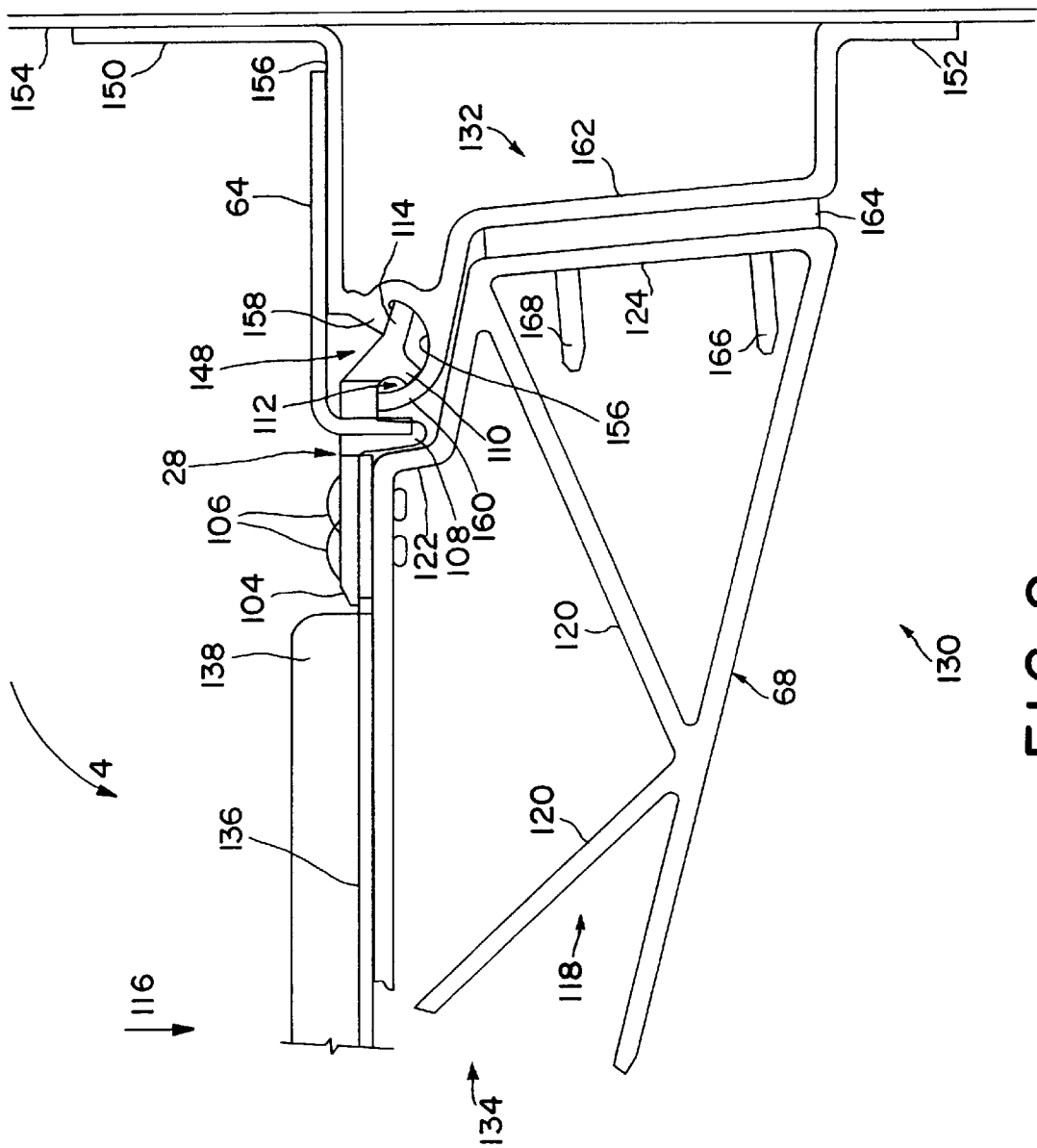
FIG. 8 is a cross-sectional view of the stowable shelf assembly of FIG. 7 along line II—II with the shelf located in the use position.

Specifically, a cross-sectional view of stowable shelf assembly 130 with shelf 134 located in use position 4 is shown in FIG. 8. Bracket 132 comprises wall panels 150, 152 that attach to wall 154. Similar to the previous embodiment, wall panels 150, 152 can be attached to wall 154 by sufficient fastening means, including bolts, welds and the like. Wall panel 150 is appended to top panel 156 which extends outward from wall 154. Channel 148 is appended to top panel 154 opposite wall panel 150. Channel 148 is sized to receive hinge 28 and comprises a channel wall 156 extending generally the length of bracket 132. A support flange 158 extends from channel wall 156 along the length of same. An end flange 160 is provided opposite top panel 156. Support and end flanges 158, 160 are configured to hold shelf 134 in use position 4, as discussed in greater detail hereinafter below.

A gusset brace 162 is provided between channel 148 and wall panel 152. In the illustrated embodiment, gusset brace 162 is a bent structure configured to receive gusset 68 adjacent same. Gusset 68 is attached to shelf portion 136, similar to that described with stowable shelf assembly 2. Gusset 68 comprises a frame 118 with a plurality of angled supports 120 extending within frame 118. Frame 118 includes first and second frame walls 122, 124. In use position 4, frame wall 122 is positioned adjacent flange 108 of hinge 28, and frame wall 124 is positioned adjacent pad 164. In the illustrated embodiment, pad 164 is attached to frame wall 124 via pins 166, 168. As weight is applied causing force 116, a moment force is created about hinge 28/channel 148. This causes a force to be applied from frame wall 124 to gusset brace 162, thus, aiding the supporting strength of gusset 68. It is appreciated that pad 164, like pads 46, 48, 70, 72, can be made from any force-absorbing material, including rubber, vinyl, foam or plastic, for example. It is also appreciated that stowable shelf assembly 130 may include a second gusset (not shown) positioned on shelf panel 136 in a similar fashion to gusset 66 of stowable shelf assembly 2.

Figure 9:
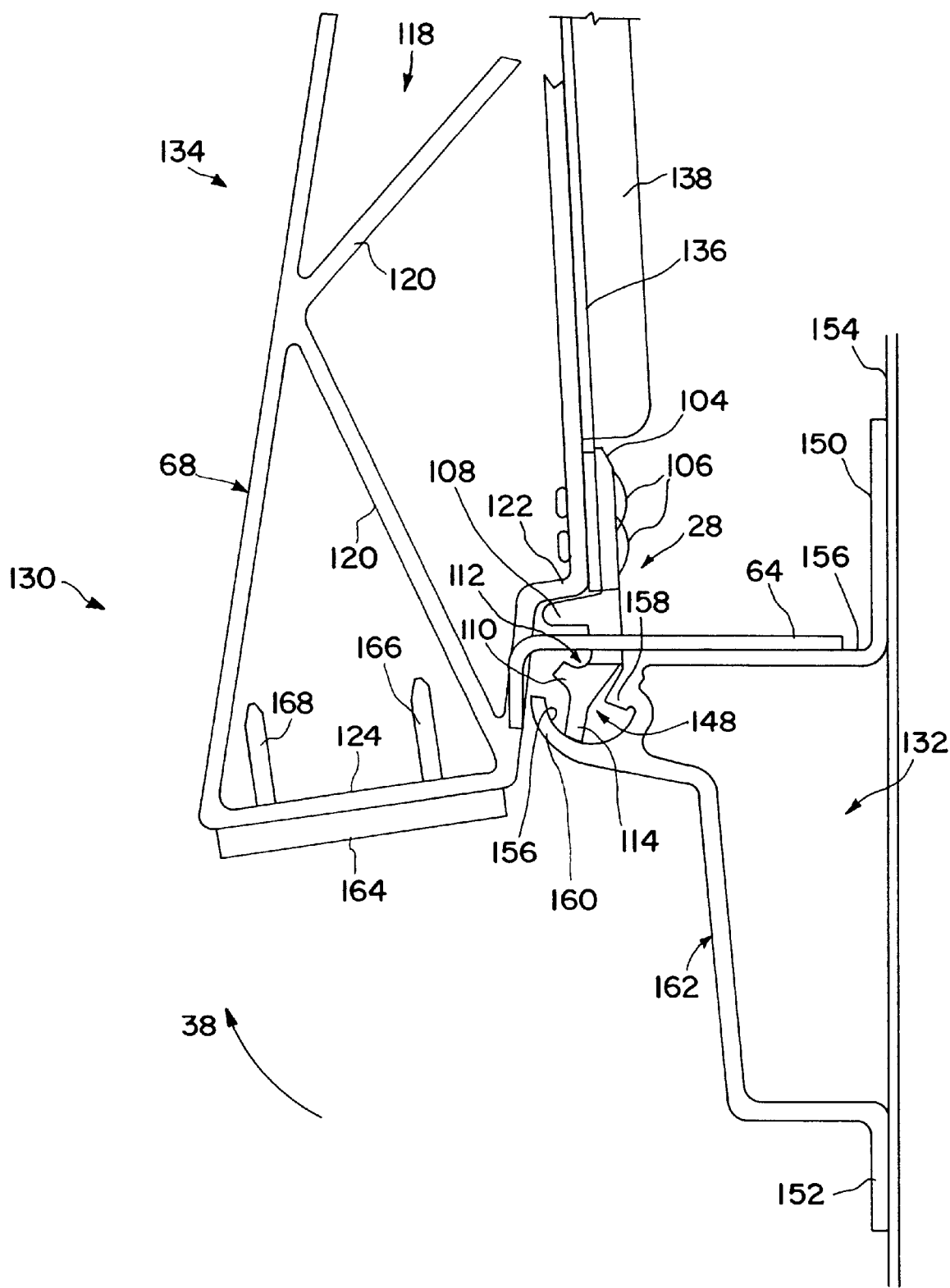
FIG. 9 is a cross-sectional view of the stowable shelf assembly of FIG. 7 along line II—II with the shelf oriented in the stowed position.

Hinge 28, shown in FIGS. 8 and 9, is illustratively identical to hinge 28 of FIGS. 3 and 4. Hinge 28 is shown attached to shelf panel 136 by a hinge panel 104 extending the surface of and positioned adjacent to shelf panel 136. As previously discussed, fasteners 106, like rivets or threaded screws, extend through both hinge panel 104 and shelf panel 136 to secure same together. Hinge 28 further includes a first flange 108 extending therefrom and along the length of hinge 28 positioned adjacent end flange 160 on channel 148 when shelf 134 is in use position 4. Flange 110, also extending from hinge 28 and along the length of the same, is positioned adjacent end flange 160 on channel 148 when shelf 134 is in use position 4. Flanges 108, 110 form a channel 112 therebetween, sized to receive end flange 160.

As all previously discussed, flange 114 extends generally transversely from flange 110. Flange 114 is seated adjacent support flange 158 on channel wall 146. In a similar fashion to stowable shelf assembly 2, as force 116, like weight from mail or parcels, is applied to shelf 134, flange 108 is seated adjacent end flange 160 when shelf 134 is in the use position. Flange 160 of channel 148 is seated in channel 112 of hinge 28 serving as a support or fulcrum. The downward movement caused by force 116 causes flange 114 to pivot upward and about flange 158.

In this embodiment, as was discussed with shelf assembly 2, "L"-shaped brackets 62, 64 are provided to interfere with lateral movement of hinge 28 relative to channel 148. This, of course, prevents shelf 134 from being removed without removing the brackets.

A cross-sectional view of stowable shelf assembly 130 is shown in FIG. 9 with shelf 134 located in stowed position 38. As previously discussed, shelf 134 is movable between use and stowed positions 4, 38, respectively. When shelf 134 is moved to stowed position 38, hinge 28 is positioned such that hinge panel 104 is oriented in a generally vertical position. Flange 114 moves to a spaced apart position relative to support flange 158 while still adjacent channel wall 156. End flange 160 from channel 148 is spaced apart from channel 112 and flanges 108, 110 are no longer positioned adjacent end flange 160 and channel wall 156, respectively. In similar fashion to shelf assembly 2, it is appreciated that flange 114 will travel along the curvature of channel wall 156 being carried by same as shelf 134 is located in stowed position 38.

Figure 10:
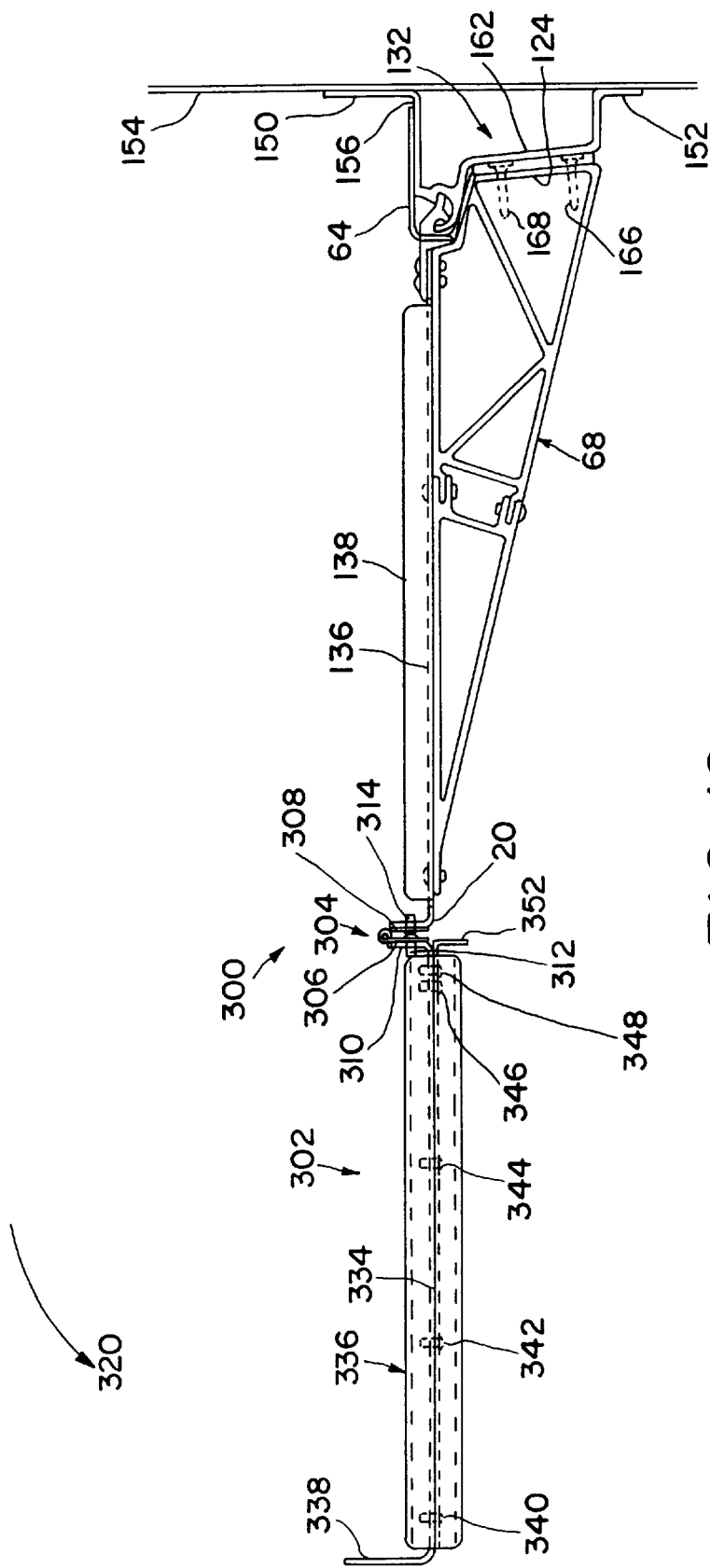
FIG. 10 is a side view of still another embodiment of the stowable shelf assembly with the shelf located the use position.
Figure 11:
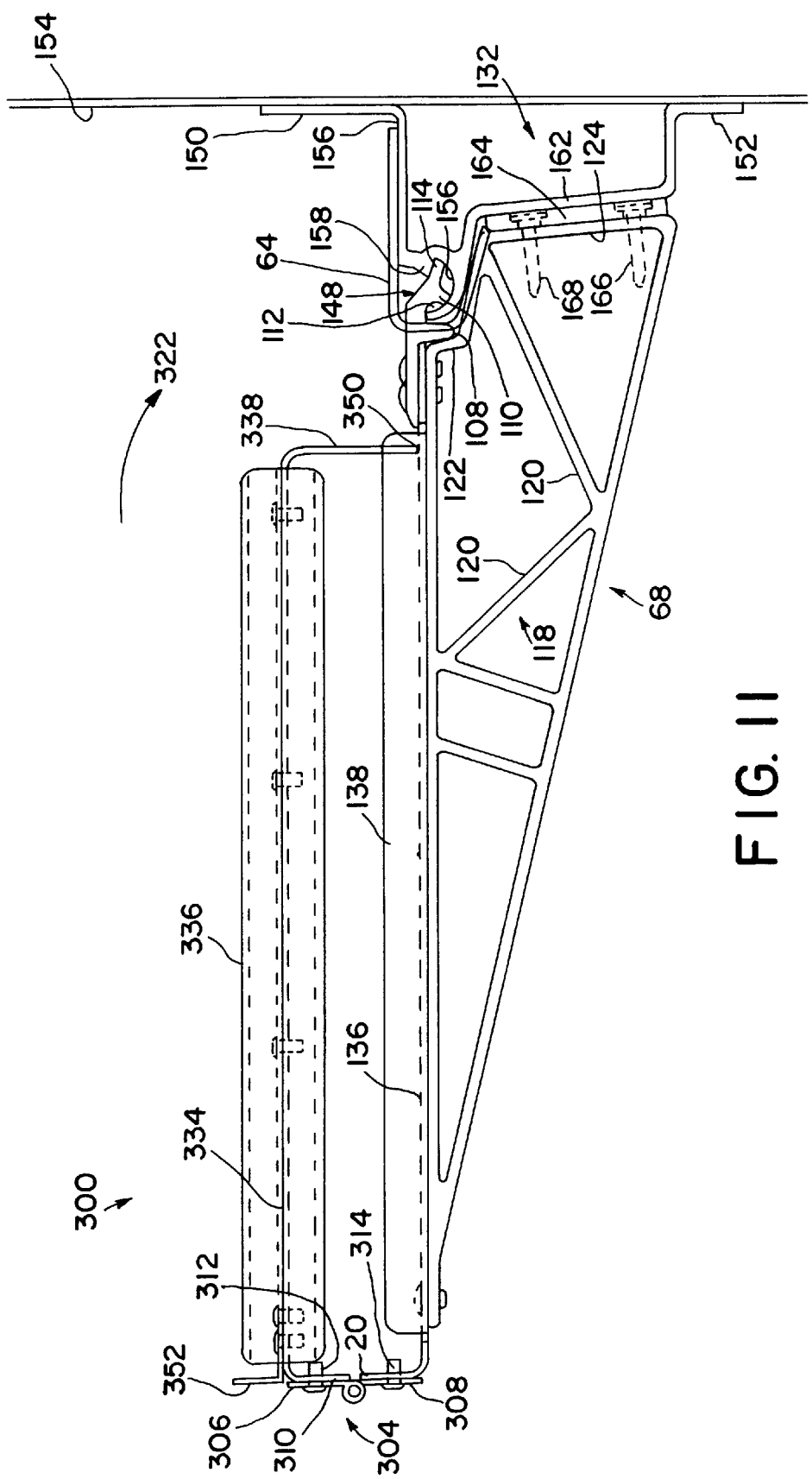
FIG. 11 is a side view of the stowable shelf assembly of FIG. 10 with the shelf located in the use position.
Figure 12:
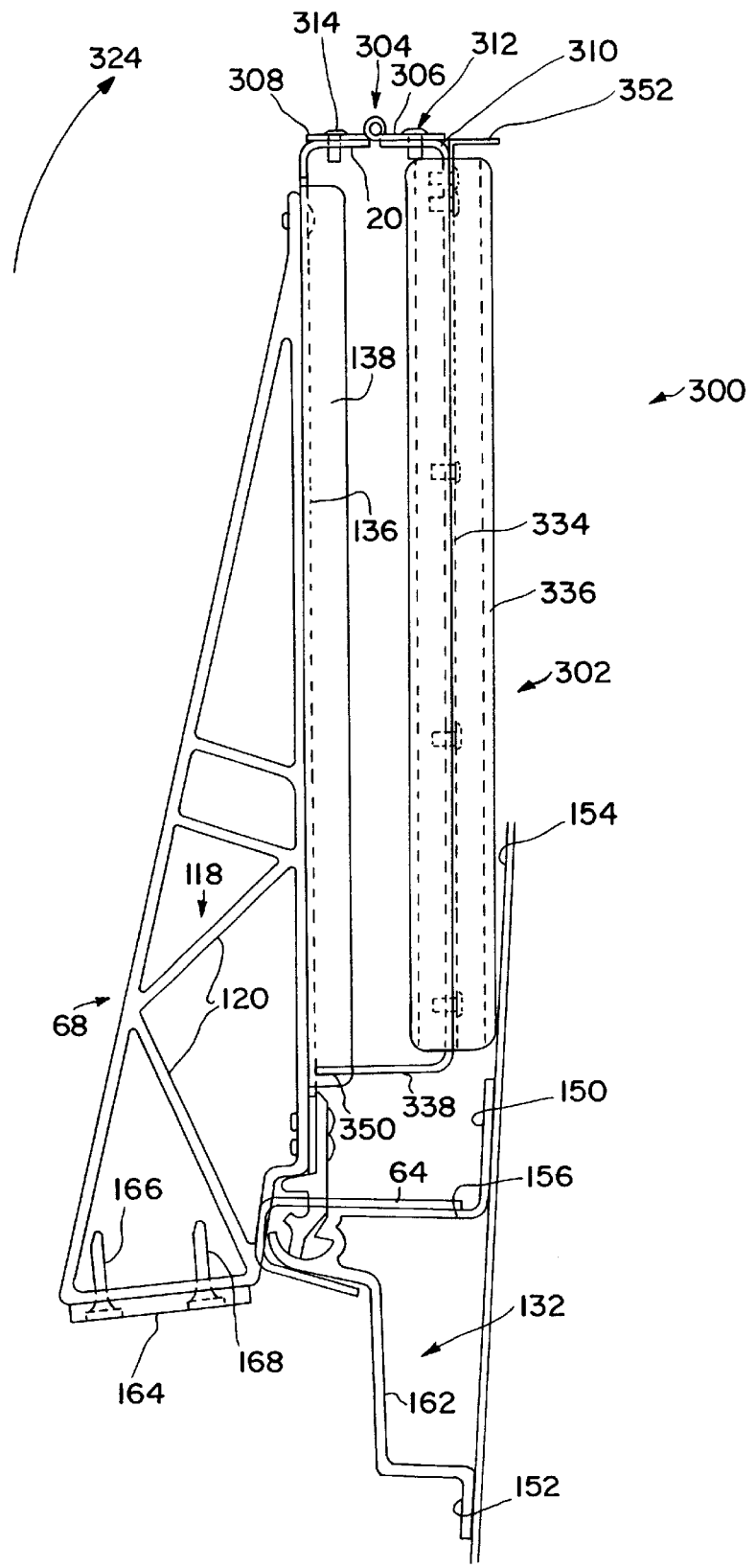
FIG. 12 is a side view of the stowable shelf assembly of FIG. 10 with the shelf located in the stowed position.

Another embodiment of a removable shelf assembly 300 is shown in FIGS. 10 through 12. This embodiment includes a shelf extension assembly 302 foldably attached to shelf assembly 2 at hinge 304. Shelf assembly 302 is shown in its unfolded use position 320 in FIG. 10. In this position, additional shelf space is available to carry parcels. As shown in FIGS. 11 and 12, shelf assembly 302 can be moved to folded and stowed positions 322, 324, respectively. Such a shelf assembly, however, does not take appreciably more space than shelf assembly 2 of the previous embodiment. To fold shelf assembly 302 relative to shelf assembly 2, hinge 304 comprises two halves 306, 308 that pivot relative to each other. Half 306 is attached to side rail 310 via fastener 312. (See, e.g., FIG. 11.) Hinge 308 is attached to side rail 20 via fastener 314.

Shelf assembly 302 further comprises a shelf panel 334 and two end rails, one of which being shown as reference numeral 336. (The other end rail is positioned opposite end rail 336, but is not shown.). End rail 336 is shown attached to panel 334 by fasteners 340, 342, 344, 346. These fasteners, like fastener 348, attaches side rail 310 to panel 334. It is appreciated, however, that any other sufficient fastening means can be used in place of the shown fasteners.

End rail 336 is configured to extend both above and below panel 334. This allows shelf assembly 302 to be useful for carrying parcels even when assembly 302 is in folded position 322, as shown in FIG. 11. Tip 350 of side rail 338 contacts panel 14, thereby supporting shelf assembly 302 while in folded position 322. Illustratively, parcels can be placed on panel 334 even in this position. The portion of end rail 336, extending below panel 334 in FIG. 10, is positioned above panel 334 in FIG. 11. End rail 336 helps prevent parcels from sliding off panel 334 when assembly 302 is in either the unfolded position 320 or the folded position 322. An auxiliary rail 352 appends from panel 334 and extends opposite rail 310. Rail 352 also helps prevent parcels from sliding off panel 334 when assembly 302 is in the folded position 322.

Being in folded position 322 allows shelf assembly 302 to be moved into stowed position 324, shown in FIG. 12, similar to stowed position 38 of the previous embodiment, shown in FIG. 2. It is appreciated that assembly 300 in stowed position 320 does not require an appreciably greater amount of space than the previous embodiment. It is also appreciated that a clasp, similar to clasp 40 from the previous embodiment, can be used to selectively maintain the shelf in the stowed position.

Although the foregoing embodiments have been described, one skilled in the art can easily ascertain the essential characteristics of the assembly, and various changes and modifications may be made to adapt the various uses and characteristics without departing from the spirit and scope of this disclosure, as described by the claims which follow.

What is claimed is:

1. A stowable shelf assembly for use in a vehicle, the shelf assembly comprising:
   a shelf having a first flange and a brace member each extending outwardly from the shelf, and the shelf being selectively movable between use and stowed positions; and
   a bracket having a second flange and a support each extending outwardly from the bracket;
   wherein the first flange of the shelf is located between the second flange and the support, and the first flange abuts the second flange such that the shelf is carried by the support and the brace member is adjacent the bracket while the shelf is located in the use position; and
   wherein the first flange is spaced apart from the second flange, the shelf is spaced apart from the support and the brace member is spaced apart from the bracket while the shelf is located in the stowed position.

2. The stowable shelf of claim 1, wherein the shelf is movable to a removed position that is spaced apart from the bracket.

3. The stowable shelf of claim 1, wherein the bracket further comprises a channel extending between the second flange and the support, and configured to receive the first flange of the shelf.

4. The stowable shelf of claim 3, wherein the channel carries the first flange when the shelf is in the stowed position.

5. The stowable shelf of claim 1, wherein the shelf comprises a third flange extending outwardly from the shelf and positioned adjacent the support of the bracket when the shelf is in the use position, and spaced apart from the support of the bracket when the shelf is in the stowed position.

6. The stowable shelf of claim 1, wherein a latch couples to the shelf to selectively maintain the shelf in the stowed position.

7. The stowable shelf of claim 1, wherein the shelf comprises a shelf extension.

8. The stowable shelf of claim 7, wherein the shelf extension foldably extends from the shelf between first and second use positions and a stowed position.

9. A vehicle for carrying parcels having at least one side wall, the vehicle comprising:
   a shelf having a first flange and a brace member, each extending outwardly from the shelf, and the shelf being selectively movable between use and stowed positions; and
   a bracket attached to the sidewall of the vehicle, the bracket having a second flange and a support each extending outwardly from the bracket;
   wherein the first flange of the shelf is located between the second flange and the support, and the first flange abuts the second flange, the shelf is carried by the support and the brace member is adjacent the bracket while the shelf is in the use position; and
   wherein the first flange is spaced apart from the second flange, the shelf spaced apart from the support and the brace member is spaced apart from the bracket while the shelf is in the stowed position.

* * * * *